(12) United States Patent
Tanikawa et al.

(10) Patent No.: US 8,037,172 B2
(45) Date of Patent: Oct. 11, 2011

(54) OPERATION MONITORING APPARATUS, OPERATION MONITORING METHOD, AND COMPUTER-READABLE RECORDING MEDIUM STORING OPERATION MONITORING PROGRAM

(75) Inventors: Yasutaka Tanikawa, Kawasaki (JP); Tomohiro Hikita, Sendai (JP); Ikuko Tachibana, Kawasaki (JP); Toshiaki Hayashi, Kawasaki (JP); Takashi Tanifuji, Kawasaki (JP); Yoshihiro Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 12/124,667

(22) Filed: May 21, 2008

(65) Prior Publication Data

US 2008/0294739 A1 Nov. 27, 2008

(30) Foreign Application Priority Data

May 25, 2007 (JP) ................................. 2007-139664

(51) Int. Cl.
*G06F 15/16* (2006.01)
(52) U.S. Cl. .......................... 709/224; 709/202; 709/223
(58) Field of Classification Search .................. 709/224, 709/223, 310, 202; 714/39, 47; 370/252; 340/825–825.98, 3.1–3.9
See application file for complete search history.

(56) References Cited

U.S. PATENT DOCUMENTS

| 7,339,957 B2 * | 3/2008 | Hitt ............................... 370/509 |
| 2003/0131099 A1 * | 7/2003 | Springmeyer et al. ........ 709/224 |
| 2004/0010586 A1 * | 1/2004 | Burton et al. .................. 709/224 |
| 2010/0064013 A1 * | 3/2010 | Aranzulla ..................... 709/206 |

FOREIGN PATENT DOCUMENTS

| JP | 2001-325123 | 11/2001 |
| JP | 2002-229870 | 8/2002 |

* cited by examiner

*Primary Examiner* — Wing Chan
*Assistant Examiner* — Ruolei Zong
(74) *Attorney, Agent, or Firm* — Staas & Halsey LLP

(57) ABSTRACT

An operation monitoring apparatus monitors statuses of plural monitoring target apparatus connected to a network, by sending a connection confirmation mail, via a notification server located on the network, receiving the connection confirmation mail and an operation confirmation mail sent from each monitoring target apparatus, storing a scheduled transmission time of a next operation confirmation mail contained in the operation confirmation mail, as part of apparatus information of the monitoring target apparatus and judging, using the scheduled transmission time, whether the next operation confirmation mail has been received. The judgment is not made if a latest connection confirmation mail sent from the operation monitoring apparatus itself has not been received.

5 Claims, 6 Drawing Sheets

FIG. 3

| TRANSMISSION TIME | RECEPTION STATUS |
|---|---|
| 2007/5/1<br>14:00 | NOT RECEIVED |
| 2007/5/1<br>13:50 | RECEIVED |
| 2007/5/1<br>13:40 | RECEIVED |
| ⋮ | ⋮ |

FIG. 4

| APPARATUS ID | SCHEDULED TRANSMISSION TIME | RECEPTION TIME | OPERATION STATUS |
|---|---|---|---|
| 0001 | 2007/5/1 7:00 | 2007/5/1 7:30 | IN OPERATION |
| 0002 | 2007/5/1 9:00 | | NOT IN OPERATION |
| 0003 | 2007/5/1 12:00 | 2007/5/1 13:10 | IN OPERATION |
| ⋮ | ⋮ | ⋮ | ⋮ |

OPERATION MONITORING APPARATUS, OPERATION MONITORING METHOD, AND COMPUTER-READABLE RECORDING MEDIUM STORING OPERATION MONITORING PROGRAM

CROSS-REFERENCE TO RELATED APPLICATIONS

This application is related to and claims priority to Japanese patent application no. 2007-139664 filed on May 25, 2007 in the Japan Patent Office, and incorporated by reference herein.

BACKGROUND

1. Field

The embodiments of the present invention relate to an operation monitoring apparatus and an operation monitoring method for monitoring the operation statuses of plural operation monitoring target apparatus that are connected to the operation monitoring side via a network.

2. Description of the Related Art

Japanese Laid-Open Patent Publication No. 2002-229870 and No. 2001-325123 disclose techniques in which a monitoring apparatus monitors the operation statuses of plural monitoring target apparatus that are connected to it via a network. The Japanese Laid-Open Patent Publication No. 2002-229870 discloses a monitoring system in which a monitoring apparatus sends a check signal to each monitoring target apparatus and judges that a monitoring target apparatus is not operating normally if no response to the check signal is received from it. The Japanese Laid-Open Patent Publication No. 2001-325123 discloses a monitoring system in which each monitoring target apparatus sends an operation confirmation mail to a monitoring apparatus on a regular basis and the monitoring apparatus judges that a monitoring target apparatus is not operating normally if no operation confirmation mail is received from it by a scheduled reception time.

SUMMARY

According to an aspect of an embodiment, an operation monitoring apparatus is provided monitoring operation statuses of plural monitoring target apparatus connected to it over a network, the operation monitoring apparatus including a sending unit for sending a connection confirmation mail which is directed to the operation monitoring apparatus itself, via a notification server located on the network, a receiving unit for receiving the connection confirmation mail and an operation confirmation mail that is sent from each of the monitoring target apparatus, a storing unit for storing a scheduled transmission time of a next operation confirmation mail that is contained in the operation confirmation mail received by the receiving unit, as part of apparatus information of the monitoring target apparatus, and a judging unit for making, using the scheduled transmission time, a judgment as to whether or not the next operation confirmation mail has been received, the judging unit refraining from making the judgment if the receiving unit has not received a latest connection confirmation mail sent from the operation monitoring apparatus itself.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 shows the data structure of a connection confirmation mail information file;

FIG. 4 shows the data structure of a monitoring target apparatus information file;

DETAILED DESCRIPTION OF THE PREFERRED EMBODIMENTS

An operation monitoring apparatus according to a preferred embodiment will be hereinafter described in detail with reference to the accompanying drawings.

Figure 1:
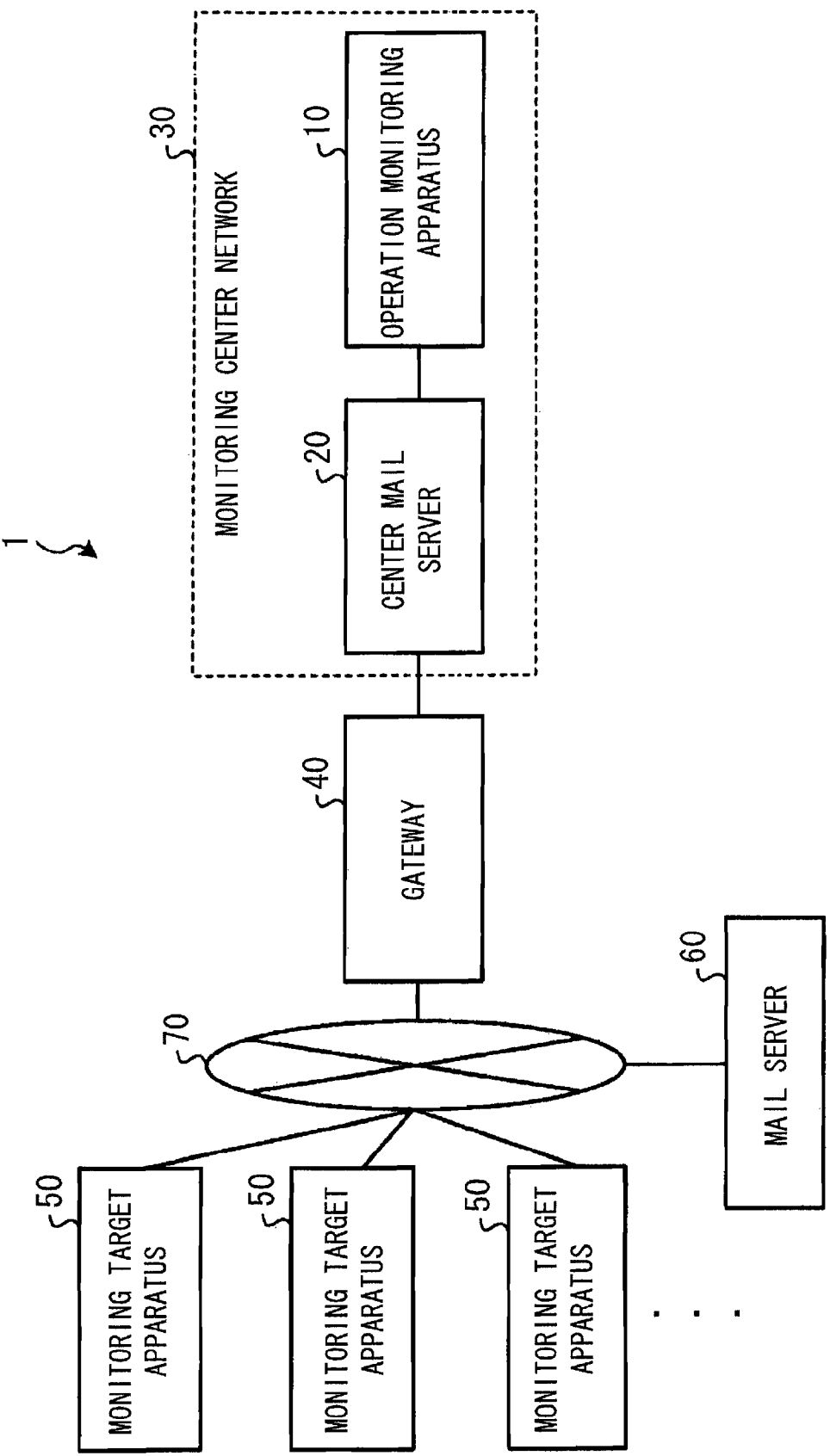
FIG. 1 shows the configuration of an operation monitoring system according to an embodiment.

First, the configuration of the operation monitoring system according to the embodiment will be described. FIG. 1 shows the configuration of the operation monitoring system. As shown in FIG. 1, the operation monitoring system 1 has an operation monitoring apparatus 10, a center mail server 20, a gateway 40, monitoring target apparatus 50, and a mail server 60. The operation monitoring apparatus 10 and the center mail server 20 belong to a monitoring center network 30 and are connected to the Internet 70 via the gateway 40.

Each monitoring target apparatus 50 sends an operation confirmation mail to the operation monitoring apparatus 10 on a regular basis. The operation confirmation mail is a mail for informing the operation monitoring apparatus 10 that a monitoring target apparatus 50 that sends it is operating normally. The operation confirmation mail contains information of a scheduled transmission time of a next operation confirmation mail.

The operation monitoring apparatus 10 judges the operation status of each monitoring target apparatus 50 by judging whether or not an operation confirmation mail has been received around a scheduled transmission time. The operation monitoring apparatus 10 sends a connection confirmation mail to itself on a regular basis, and judges the operation statuses of the monitoring target apparatus 50 using operation confirmation mails only if a latest connection confirmation mail has been received. The connection confirmation mail is a mail that is sent via the mail server 60 to check the communication status inside the monitoring center network 30. The mail server 60 is equipped with a mail sending server, e.g., SMTP (simple mail transfer protocol) server and a mail receiving server, e.g., POP3 (post office protocol version 3) server.

Figure 2:
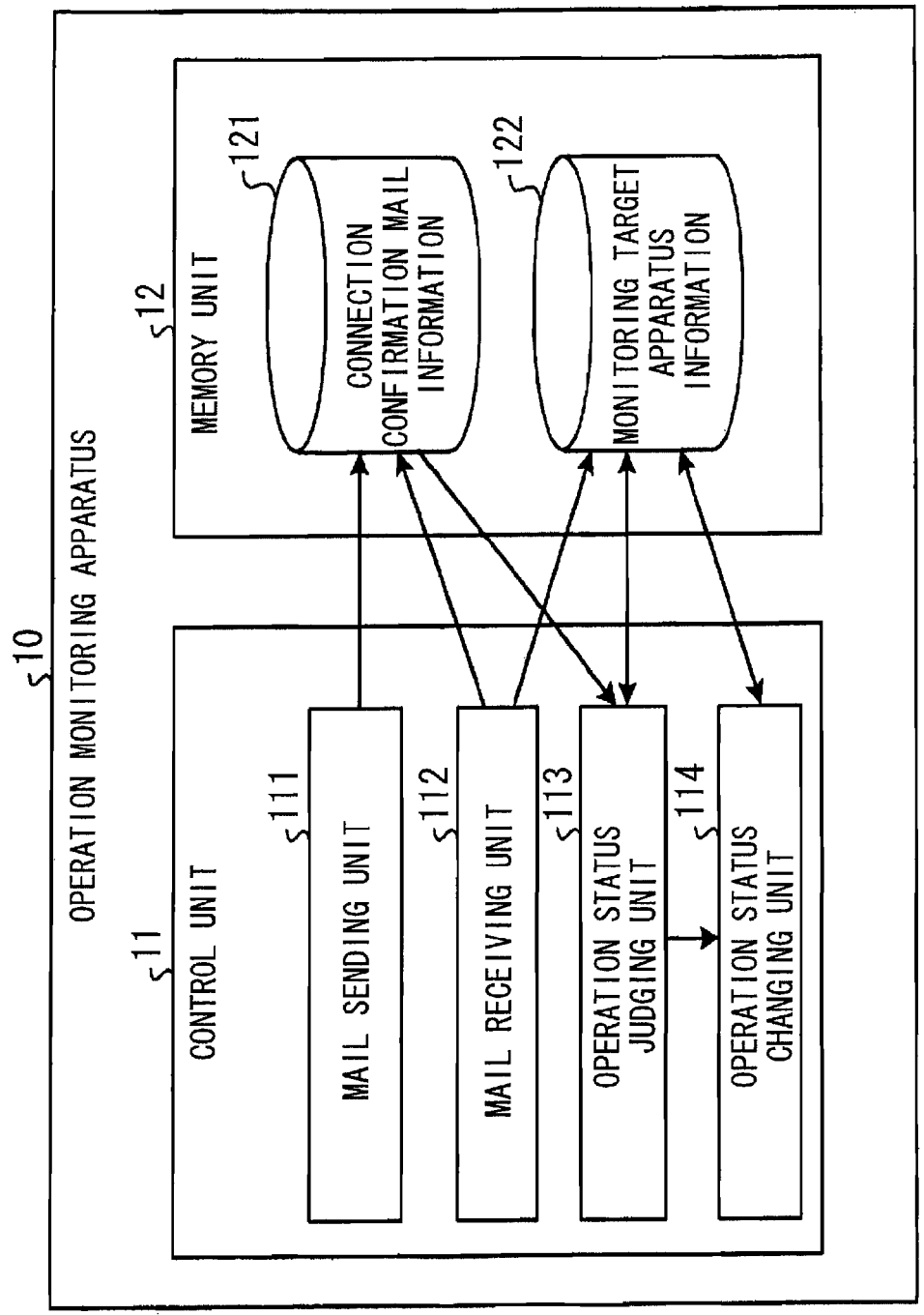
FIG. 2 is a functional block diagram of an operation monitoring apparatus.

The configuration of the operation monitoring apparatus 10 will be described below with reference to FIG. 2. FIG. 2 is a functional block diagram of the operation monitoring apparatus 10. As shown in FIG. 2, the operation monitoring apparatus 10 is equipped with a control unit 11 for controlling the operation monitoring apparatus 10 and a memory unit 12 for storing a connection confirmation mail information file 121 and a monitoring target apparatus information file 122 which contain information to be used for processing of the control unit 11.

A description will now be made of the data structures of the connection confirmation mail information file 121 and the monitoring target apparatus information file 122. FIG. 3 shows the data structure of the connection confirmation mail information file 121. For example, the connection confirmation mail information file 121 has, as data items, a "transmission time" and a "reception status." The "transmission time" is a time when a connection confirmation mail was sent to the operation monitoring apparatus 10 itself. The "reception status" is information indicating whether or not a connection confirmation mail directed to the operation monitoring apparatus 10 itself was received.

FIG. 4 shows the data structure of the monitoring target apparatus information file 122. For example, the monitoring target apparatus information file 122 has, as data items, an "apparatus ID," a "scheduled transmission time," a "reception time," and an "operation status." The "apparatus ID" is an identification code for unique identification of a monitoring target apparatus 50. The "scheduled transmission time" is a scheduled transmission time of an operation confirmation mail to be sent next from a monitoring target apparatus 50. The "reception time" is a time when an operation confirmation mail that had been scheduled to be sent from the monitoring target apparatus 50 at the time indicated by the associated "scheduled transmission time" was received actually. The "operation status" is information indicating whether or not a monitoring target apparatus 50 is in operation. More specifically, the "scheduled transmission time" is a next scheduled transmission time that is contained in an operation confirmation mail and is entered after the operation confirmation mail has been received and the operation status (described later) has been judged.

The record shown in FIG. 4 whose apparatus ID is "0001" indicates that an operation confirmation mail having a scheduled transmission time "2007/5/1 7:00" was received at "2007/5/1 7:30" and hence the operation status is set to "in operation." In actuality, when the operation status of the monitoring target apparatus 50 whose apparatus ID is "0001" has been judged, a next scheduled transmission time contained in the operation confirmation mail received at "2007/5/1 7:30" is entered into the space "scheduled transmission time" of this record and its preceding scheduled transmission time is cleared.

As for the record shown in FIG. 4 whose apparatus ID is "0002," no operation confirmation mail having a scheduled transmission time "2007/5/1 9:00" has been received even after a lapse of a reprieve time (e.g., 3 hours) and hence the operation status is set to "not in operation."

The apparatus IDs are stored in the memory unit 12 so as to be correlated with mail addresses of the monitoring target apparatus 50, respectively.

The control unit 11 shown in FIG. 2 is equipped with a mail sending unit 111, a mail receiving unit 112, an operation status judging unit 113, and an operation status changing unit 114.

The mail sending unit 111 sends a connection confirmation mail to the operation monitoring apparatus 10 itself on a regular basis (e.g., every 10 minutes). Since the connection confirmation mail is a mail which is sent to check the communication status inside the monitoring center network 30, it needs to be sent from the mail server 60 which is located outside the monitoring center network 30 to the center mail server 20 which is located inside the monitoring center network 30. Therefore, the mail sending unit 111 sends a connection confirmation mail in such a manner that it passes through the mail server 60 as the mail sending server which is located outside the monitoring center network 30. As a result, the connection confirmation mail is sent via the mail server 60 located on the Internet 70. Upon sending a connection confirmation mail, the mail sending unit 111 adds a record to the connection confirmation mail information file 121, enters a transmission time of the connection confirmation mail into the "transmission time" space of the added record, and enters information indicating that the connection confirmation mail has not been received yet into the "reception status" space.

The mail receiving unit 112 receives operation confirmation mails sent from the monitoring target apparatus 50 and a connection confirmation mail sent from the mail sending unit 111. The mail receiving unit 112 enters a scheduled transmission time of a next operation confirmation mail that is contained in a received operation confirmation mail into a "scheduled transmission time" space of the monitoring target apparatus information file 122. More specifically, the mail receiving unit 112 searches the monitoring target apparatus information file 122 for a monitoring target apparatus information record using the apparatus ID of a monitoring target apparatus 50 as a transmission source of an operation confirmation mail and enters a scheduled transmission time of a next operation confirmation mail that is contained in the received operation confirmation mail into the "scheduled transmission time" space of the record found. Upon receiving a connection confirmation mail, the mail receiving unit 112 enters information indicating reception of the connection confirmation mail into a "reception status" space of the connection confirmation mail information file 121.

The operation status judging unit 113 judges, using a scheduled transmission time, whether or not an operation confirmation mail that is scheduled to be sent at the scheduled transmission time has been received. If such an operation confirmation mail has been received, the operation status judging unit 113 judges that the monitoring target apparatus 50 that sent the operation confirmation mail is operating normally. On the other hand, if no such operation confirmation mail has been received, the operation status judging unit 113 judges whether or not the reprieve time (e.g., 3 hours) has elapsed from the scheduled transmission time. If the reprieve time has elapsed from the scheduled transmission time, the operation status judging unit 113 judges that the monitoring target apparatus 50 is not operating normally. If the reprieve time has not elapsed yet from the scheduled transmission time, the operation status judging unit 113 infers that the monitoring target apparatus 50 is operating normally and delays making a final decision until next operation monitoring processing.

Operation monitoring processing includes the above-described series of judgment steps executed by the operation status judging unit 113 and is started upon issuance of an operation monitoring processing command. The operation monitoring processing command may be issued on a regular basis (e.g., every one hour) or issued arbitrarily by an operator. The operation monitoring processing command includes the apparatus ID of each monitoring target apparatus 50 and might also include the reprieve time from a scheduled transmission time.

Upon issuance of an operation status processing command, the operation status judging unit 113 judges, by referring to the connection confirmation mail information file 121, whether or not a latest connection confirmation mail sent by the mail sending unit 111 has been received by the mail receiving unit 112. If a latest connection confirmation mail has been received, the operation status judging unit 113 judges whether or not an operation confirmation mail has been received. On the other hand, if a latest connection confirmation mail has not been received yet, the operation status judging unit 113 waits for a prescribed time and again judges whether or not a latest connection confirmation mail has been received.

While the center mail server 20 or the communications infrastructure in the monitoring center network 30 is not in operation due to repair work, a malfunction, or the like, the operation monitoring apparatus 10 cannot receive operation confirmation mails or connection confirmation mails. When the center mail server 20 or the communications infrastructure has recovered, the operation monitoring apparatus 10 sequentially receives and processes operation confirmation mails and connection confirmation mails that have piled up while the center mail server 20 or the communications infrastructure was in halt. In the operation monitoring apparatus 10 according to the embodiment, operation monitoring processing can be rendered in a standby state until a latest connection confirmation mail is received. Therefore, operation monitoring processing can be restarted with proper timing after processing of receiving operation confirmation mails that have piled up while the center mail server 20 or the communications infrastructure was in halt.

If the operation status judging unit 113 judges that no operation confirmation mail has been received before a lapse of the reprieve time from a scheduled transmission time, the operation status changing unit 114 changes the operation status information of the monitoring target apparatus 50 concerned to information indicating that it is not in operation. More specifically, the operation status changing unit 114 searches the monitoring subject apparatus information file 122 for a monitoring subject apparatus information record using the apparatus ID of the monitoring target apparatus 50 concerned and enters information indicating that it is not in operation into the "operation status" space of the record found. This makes it possible to inform a manager of monitoring target apparatus 50 concerned that an abnormality has been detected therein.

Figure 5:
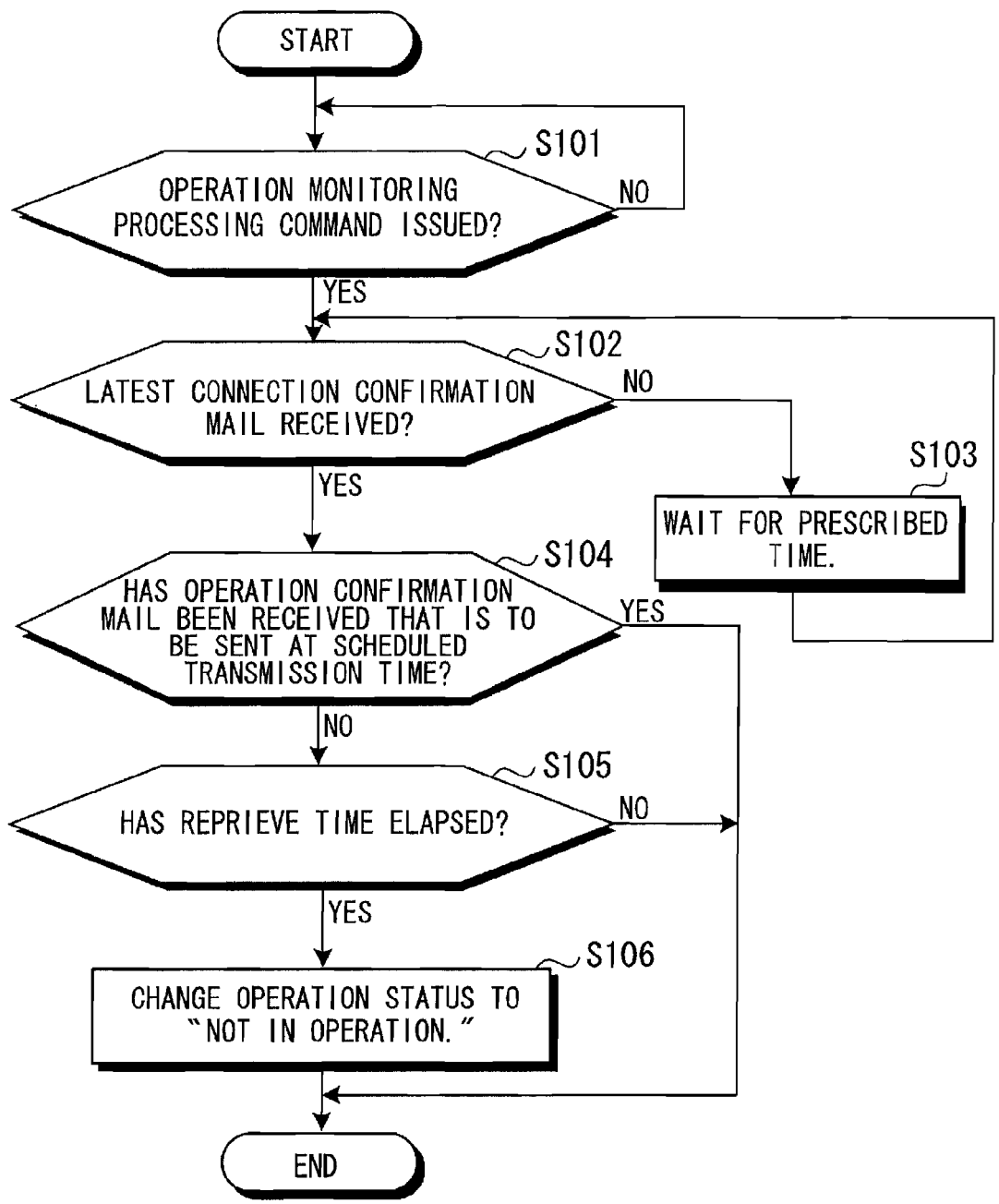
FIG. 5 is a flowchart showing the procedure of an operation monitoring process.

Next, the procedure of an operation monitoring process executed by the operation monitoring apparatus 10 will be described with reference to FIG. 5. FIG. 5 is a flowchart showing the procedure of the operation monitoring process. This process is for judging the operation status of a monitoring target apparatus 50 corresponding to an operation monitoring processing command upon its issuance (an operation monitoring processing command is issued on a regular basis for each monitoring target apparatus 50).

First, at S101, the operation status judging unit 113 of the operation monitoring apparatus 10 judges whether or not an operation monitoring processing command has been issued. If the judgment result is "no" (S101: no), S101 is executed again.

On the other hand, if judging that an operation monitoring processing command has been issued (S101: yes), at S102 the operation status judging unit 113 refers to the connection confirmation mail information file 121 and judges whether or not a latest connection confirmation mail that was sent by the mail sending unit 111 has been received by the mail receiving unit 112. If the judgment result is "no" (S102: no), at S103 the operation status judging unit 113 waits for a prescribed time. Then, the process returns to S102.

On the other hand, if judging at S102 that a latest connection confirmation mail has been received (S102: yes), at S104 the operation status judging unit 113 judges whether or not an operation confirmation mail that is scheduled to be sent at a scheduled transmission time has been received. If the judgment result is "yes" (S104: yes), the operation monitoring process is finished.

On the other hand, if judging that no such operation confirmation mail has been received yet (S104: no), at S105 the operation status judging unit 113 judges whether or not the reprieve time has elapsed from the scheduled transmission time. If the judgment result is "no" (S105: no), the operation monitoring process is finished.

On the other hand, if it is judged that the reprieve time has elapsed from the scheduled transmission time (S105: yes), at S106 the operation status changing unit 114 changes the operation status information of the monitoring target apparatus 50 concerned to information indicating that it is not in operation. Then, the operation monitoring process is finished.

As described above, in the operation monitoring apparatus 10 according to the embodiment, a connection confirmation mail is sent to the operation monitoring apparatus 10 itself via the mail server 60 which is located on the Internet 70. And the reception status of an operation confirmation mail to be sent from each monitoring target apparatus 50 can be judged only when the connection confirmation mail is received. Therefore, the operation status of each monitoring target apparatus 50 can be judged only when the communication status of the operation monitoring apparatus 10 is normal.

In the embodiment, the operation status of each monitoring target apparatus 50 can be judged merely by its sending an operation confirmation mail. That is, the operation status of each monitoring target apparatus 50 can be judged without requiring the operation monitoring apparatus 10 to access it.

Therefore, the operation monitoring apparatus 10 can prevent an erroneous judgment of an operation status while maintaining the security of the monitoring target apparatus 50.

Although in the above embodiment connection confirmation mails and operation confirmation mails are exchanged, information exchange method is not limited to the use of mails. For example, messages may be exchanged. That is, any method may be used as long as it enables exchange of information.

In the above embodiment, if a latest connection confirmation mail has not been received yet, the operation status judging section 113 waits for the prescribed time and again judges whether or not a latest connection confirmation mail has been received. However, the re-judgment timing is not limited to the above. For example, if a latest connection confirmation mail has not been received yet, the operation status judging section 113 may stop the current operation monitoring processing and judge whether or not a latest connection confirmation mail has been received in operation monitoring processing that will be started in response to issuance of the next operation monitoring processing command.

Finally, various modifications can be made of the configuration shown in FIG. 2 of the operation monitoring apparatus 10 according to the embodiment without departing from the spirit and scope of the invention. For example, functions equivalent to the functions of the operation monitoring apparatus 10 according to the embodiment can be realized by implementing the functions of the control unit 11 of the operation monitoring apparatus 10 in the form of software and executing it with a computer. An example of a computer which runs an operation monitoring program 1071 as a software implementation of the functions of the control unit 11 will be described below.

Figure 6:
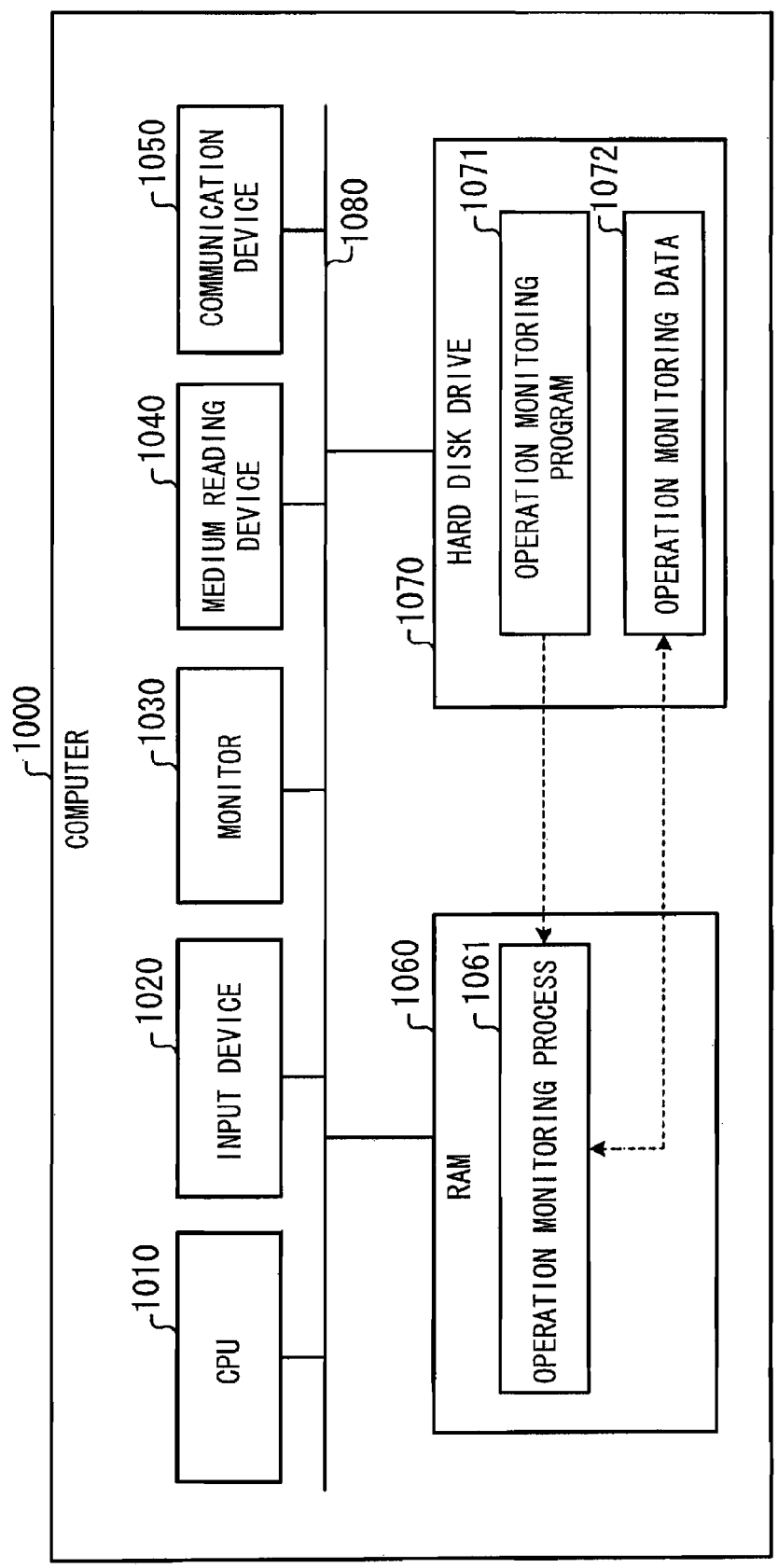
FIG. 6 is a functional block diagram of a computer which runs an operation monitoring program.

FIG. 6 is a functional block diagram of a computer which runs an operation monitoring program. The computer 1000 is configured in such a manner that a CPU (central processing unit) 1010 for performing various kinds of computation, an input device 1020 for receiving data from a user, a monitor 1030 for displaying various kinds of information, a medium reading device 1040 for reading a program etc. from a recording medium, a communication device 1050 for exchanging data with another computer over a network, a RAM (random access memory) 1060 for temporarily storing various kinds of information, and a hard disk drive 1070 are connected to each other via a bus 1080.

An operation monitoring program 1071 having the same functions as the control unit 11 shown in FIG. 2 and operation monitoring data 1072 corresponding to various data which are stored in the memory unit 12 shown in FIG. 2 are stored in the hard disk drive 1070. The operation monitoring data 1072 may be stored in an appropriately distributed manner; they may be stored in other computers that are connected to the computer 1000 via a network.

The CPU 1010 reads the operation monitoring program 1071 from the hard disk drive 1070 and develops it on the RAM 1060, whereby the operation monitoring program 1071 comes to function as an operation monitoring process 1061. The operation monitoring process 1061 develops, as appropriate, the operation monitoring data 1072 and other information read from the hard disk drive 1070 in an area of the RAM 1060 that is assigned to the process 1061 itself and performs various kinds of data processing on the basis of the developed data etc.

The operation monitoring program 1071 need not always be stored in the hard disk drive 1070 as a recording medium. For example, the operation monitoring program 1071 may be stored in another recording medium such as a CD-ROM; the computer 1000 reads and executes it. As a further alternative, the operation monitoring program 1071 may be stored in another computer (or a server) or the like that is connected to the computer 1000 via a public line, the Internet, a LAN (local area network), a WAN (wide area network), or the like; the computer 1000 reads and executes it.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of transmission communication media includes a carrier-wave signal.

Further, according to an aspect of the embodiments of the invention, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An operation monitoring apparatus for monitoring operation statuses of plural monitoring target apparatuses connected to the operation monitoring apparatus over a network, the operation monitoring apparatus comprising:

a sending unit for periodically sending a connection confirmation mail which is directed to the operation monitoring apparatus itself, via a notification server located on the network;

a receiving unit for receiving the connection confirmation mail that the sending unit has sent and an operation confirmation mail that is sent from any of the monitoring target apparatuses;

a storing unit for storing a scheduled transmission time of a next operation confirmation mail to be sent from a monitoring target unit that is contained in the operation confirmation mail received by the receiving unit, as part of apparatus information of the monitoring target apparatus;

a judging unit for making a judgment as to whether a next operation confirmation mail has been received by the scheduled transmission time of the next operation confirmation mail, wherein the judging unit refrains from making the judgment whether a next operation confirmation mail has been received for a certain time period after the judging unit has judged that the receiving unit has not received a latest connection confirmation mail sent from the operation monitoring apparatus itself, and judges whether the latest connection confirmation mail is received after the certain time period has elapsed; and an operation status changing unit for changing operation status information that is included in the apparatus information of the monitoring target apparatus corresponding to the next operation confirmation mail to information indicating that the monitoring target apparatus is not in operation, if the judging unit judges that the next operation confirmation mail has not been received.

2. The operation monitoring apparatus according to claim 1, wherein if the receiving unit has not received a next operation confirmation mail and a prescribed time from the scheduled transmission time has elapsed, the judging unit judges that the next operation confirmation mail has not been received.

3. An operation monitoring method for monitoring operation statuses of plural monitoring target apparatus connected to an operation monitoring apparatus over a network, the operation monitoring method comprising:

sending a connection confirmation mail which is directed to the operation monitoring apparatus itself, via a notification server located on the network;

receiving the sent connection confirmation mail and an operation confirmation mail that is sent from a monitoring target apparatus;

storing a scheduled transmission time of a next operation confirmation mail that is contained in the operation confirmation mail received from the monitoring target apparatus, as part of apparatus information of the monitoring target apparatus;

judging whether a next operation confirmation mail has been received by the scheduled transmission time of the next operation confirmation mail;

refraining from judging whether a next operation confirmation mail has been received for a certain time period after judging that a latest connection confirmation mail sent from the operation monitoring apparatus itself is not received, and judging whether the latest connection confirmation mail is received after the certain time period has elapsed; and changing operation status information that is included in the apparatus information of the monitoring target apparatus corresponding to the next operation confirmation mail to information indicating that the monitoring target apparatus is not in operation, if the judging judges that the next operation confirmation mail has not been received.

4. A non-transitory computer-readable recording medium in which an operation monitoring program for monitoring operation statuses of plural monitoring target apparatus connected to an operation monitoring apparatus over a network is stored, the operation monitoring program causing the computer to execute:

sending a connection confirmation mail which is directed to the operation monitoring apparatus itself, via a notification server located on the network;

receiving the sent connection confirmation mail and an operation confirmation mail that is sent from the monitoring target apparatus;

storing a scheduled transmission time of a next operation confirmation mail that is contained in the operation confirmation mail received by the receiving, as part of apparatus information of the monitoring target apparatus;

judging whether a next operation confirmation mail has been received by the scheduled transmission time of the next operation confirmation mail;

refraining from judging whether a next operation confirmation mail has been received for a certain time period after judging that a latest connection confirmation mail sent from the operation monitoring apparatus itself has not been received in the receiving, and judging whether the latest connection confirmation mail is received after the certain time period has elapsed; and changing operation status information that is included in the apparatus information of the monitoring target apparatus corresponding to the next operation confirmation mail to information indicating that the monitoring target apparatus is not in operation, if the judging judges that the next operation confirmation mail has not been received.

5. An operation monitoring apparatus configured to monitor operation statuses of plural monitoring target apparatus connected to the operation monitoring apparatus over a network, the operation monitoring apparatus comprising:

a controller that executes:

sending a connection confirmation which is directed to the operation monitoring apparatus itself, via a notification server located on the network;

receiving the sent connection confirmation and an operation confirmation that is sent from each monitoring target apparatus;

storing a scheduled transmission time of a next operation confirmation that is contained in the operation confirmation received by the receiving, as part of apparatus information of each monitoring target apparatus;

judging whether a next operation confirmation has been received by the scheduled transmission time of the next operation confirmation mail, refraining from judging whether a next operation confirmation mail has been received for a certain time period after judging that a latest connection confirmation which the operation monitoring apparatus itself sent has not been received, and judging whether the latest connection confirmation mail is received after the certain time period has elapsed, and changing operation status information that is included in the apparatus information of the monitoring target apparatus corresponding to the next operation confirmation mail to information indicating that the monitoring target apparatus is not in operation, if the judging judges that the next operation confirmation mail has not been received.

\* \* \* \* \*